United States Patent [19]

Bridges et al.

[11] Patent Number: 4,477,085
[45] Date of Patent: Oct. 16, 1984

[54] FIRE RESISTANT CONNECTIONS EMBODYING HEAT TRANSFER MEANS

[75] Inventors: Charles D. Bridges; Michael A. Karr, Jr.; Bert L. Morrison, all of Houston, Tex.

[73] Assignee: Gray Tool, Houston, Tex.

[21] Appl. No.: 469,355

[22] Filed: Feb. 24, 1983

[51] Int. Cl.³ .............................................. F16J 15/06
[52] U.S. Cl. .................... 277/22; 277/123; 277/188 R; 277/205; 277/235 R
[58] Field of Search .................... 277/22, 26, 123–125, 277/152, 188 R, 188 A, 211, 192, 193, 199, 207 A, 205, 206 R, 208, 206 A, 235 R, 236, 207 R, 235 B, 227, 228, 198, 167.5, 165

[56] References Cited

U.S. PATENT DOCUMENTS

| | | | |
|---|---|---|---|
| 954,195 | 4/1910 | Law | 277/205 X |
| 2,075,947 | 4/1937 | Kennedy | 277/188 R X |
| 2,687,909 | 8/1954 | Blackman et al. | 277/235 X |
| 2,711,333 | 6/1955 | Rodgers | 277/124 |
| 3,207,524 | 9/1965 | Trbovitch | 277/236 X |
| 3,326,560 | 6/1967 | Trbovitch | 277/205 X |
| 3,330,568 | 7/1967 | Wetzel | 277/236 X |
| 3,512,789 | 5/1970 | Tanner | 277/26 |
| 3,653,672 | 4/1972 | Felt | 277/205 |
| 4,083,570 | 4/1978 | Sugawara | 277/22 X |
| 4,116,451 | 9/1978 | Nixon et al. | 277/124 X |

FOREIGN PATENT DOCUMENTS

| | | | |
|---|---|---|---|
| 712786 | 7/1954 | United Kingdom | 277/236 |
| 1360157 | 7/1974 | United Kingdom | 277/26 |

Primary Examiner—Robert S. Ward
Attorney, Agent, or Firm—Arthur E. Fournier, Jr.

[57] ABSTRACT

A fire resistant connection (16) having heat transfer means (46) cooperatively associated therewith and that embodies a U-like sealing means (44). The fire resistant connection (16) with heat transfer means (46) is operative for purposes of effectuating the establishment of a fire resistant seal between mating surfaces (22, 18). The heat transfer means (46) includes a first heat transfer element (58), and a second heat transfer element (60). The subject fire resistant connection (16) includes the aforementioned U-like sealing means (44) and the aforereference mating surfaces (22, 18).

9 Claims, 2 Drawing Figures

FIRE RESISTANT CONNECTIONS EMBODYING HEAT TRANSFER MEANS

BACKGROUND OF THE INVENTION

Cross Reference To Related Applications

This application is hereby cross referenced to the following four patent applications which are commonly filed herewith and which are commonly assigned: U.S. patent application Ser. No. 469,358 filed Feb. 24, 1983 entitled "Fire Resistant Connections And T-Like Sealing Means Therefor", filed in the name of Frank C. Adamek; U.S. patent application Ser. No. 469,356 filed Feb. 24, 1983 entitled "Fire Resistant Connections And U-Like Sealing Means Therefor", filed in the name of Frank C. Adamek; U.S. patent application Ser. No. 469,357 filed Feb. 24, 1983 entitled "Fire Resistant Connections And Dovetail-Like Sealing Means Therefor", filed in the name of Robert E. Bush; and U.S. patent application Ser. No. 469,354 filed Feb. 24, 1983 entitled "Fire Resistant Connections And Double Ribbed Sealing Means Therefor", filed in the name of Robert E. Bush.

This invention relates to means for establishing a fire resistance connection and seal between mating surfaces found in wellhead and valve equipment, and more particularly to a fire resistant connection embodying means operative for purposes of enhancing the heat transfer characteristics of the connection.

The fact that extreme service conditions are encountered in wellhead applications has long been recognized. Moreover, it has long been known that the nature of such extreme service conditions encompasses, by way of example and not limitation, conditions such as the presence of high and low temperature, sour gas, high fluid velocity, pressure cycling, thermal shock, and/or the existence of forces of vibration, bending, compression, tension or any combination of these forces. In an effort to provide equipment that would be suitable for employment in such wellhead applications, i.e., that would successfully withstand being subjected to extreme service conditions of this type, metal-to-metal seals have heretofore been employed for purposes of effectuating connections and seals in equipment designed to be used in wellhead applications of the aforedescribed type. This selection of metal-to-metal seals for use in this manner has been influenced to some extent by environmental and economic considerations. Moreover, the metal-to-metal seals that have actually been selected for use for this purpose have been of various designs. By way of illustration, reference may be had, among others, to U.S. Pat. No. 2,766,999, which issued on Oct. 16, 1956 to J. D. Watts et al., and/or to U.S. Pat. No. 4,214,763, which issued on July 29, 1980 to R. E. Latham for a showing of a metal-to-metal seal that is disclosed to be suitable for use in equipment, which is designed for employment in wellhead applications.

Although these earlier types of metal-to-metal seals when employed in equipment designed for use in wellhead applications have proven generally to be capable of withstanding the extreme service conditions associated with such applications, i.e., conditions of the sort that have been enumerated hereinbefore, these metal-to-metal seals were never intended to be fire resistant. That is, no requirement existed insofar as the design of these metal-to-metal seals was concerned that they embody the capability of maintaining sealability during periods of thermal expansion and contraction occasioned by the occurrence of wellhead fires. It is only more recently that the matter of fire resistance has come to be viewed as a consideration in the design of connections and seals of the type found in equipment that is intended for use in wellhead applications. Moreover, to some in the industry this matter of fire resistance has gone beyond the state of being simply a consideration, but rather has now risen to the level of being a requirement that future designs of metal-to-metal seals must satisfy.

For purposes of exemplifying what constitutes fire resistant wellhead equipment as this term is being employed herein, reference can be had at least insofar as 5,000 psig and 10,000 psig working pressure equipment is concerned to the statement of requirements that is embodied in American Petroleum Institute's RP6F Modified. As set forth therein, 5,000 psig working pressure equipment must satisfy the following test criteria: flame temperature one inch from the wall—1100° C. (2000° F.); stabillization temperature with 3½ hours—650° C. (1200° F.); high test pressure throughout the test—3750 psi; low test pressure throughout the test—500 psi; charging test media-water; hold period at stabilization temperature—one hour; valve backseat test pressure for oil service—100 psi; valve backseat test pressure for gas service—500 psi; allowable leakage-zero external leakage; and functional valve test after burn-replace stem assembly, open one time, zero external leakage allowed. With respect to 10,000 psig working pressure equipment, the test criteria that must be statisfied are as follows: flame temperature one inch from the wall—1100° C. (2000° F.); stabilization temperature within 3½ hours—650° C. (1200° F.); high test pressure throughout the test—7500 psi; low test pressure throughout the test—500 psi; charging test media-water hold period at stabilization temperature—one hour; valve backseat test pressure for oil service—100 psig; valve backseat test pressure for gas service—500 psi; allowable leakage-zero external leakage; and functional valve test after burn-replace stem assembly, open one time, zero external leakage allowed.

The high temperatures which are encountered during wellhead fires give rise to a variety of problems. Included among these are problems that can be linked to the rapid thermal heatup and cooldown of the material which is exposed to the wellhead fire, the expansion and/or contraction of the exposed material, and/or a loss in the properties which the exposed material exhibits. For ease of classification, however, the aforereferenced problems fall basically into two categories. Namely, there are those problems which relate to the structural characteristics exhibited by the wellhead equipment material upon being exposed to a wellhead fire, and there are those problems that relate to the capability of connections and seals in wellhead equipment to maintain their sealability when the wellhead equipment is subjected to a wellhead fire.

Addressing first the matter of the structural characteristics of wellhead equipment material, for purposes of rendering such material fire resistant, i.e., capable of satisfying the test criteria enumerated above for 5000 psig and 10,000 psig working pressure equipment, the loss of tensile strength exhibited thereby when exposed to a wellhead fire can be compensated for in several ways. First, advantage can be taken of the fact that API's RP6F "Modified" permits a twenty-five percent downrating to be had in the pressure limits which 5000 psig working pressure equipment must be capable of withstanding. Secondly, the pressure vessel walls of the equipment in question can be oversized. Accordingly, it has been found that this twenty-five percent downrating permitted by API's RP6F "Modified" coupled with the oversizing of the pressure vessel walls of the wellhead equipment is sufficient to compensate for the loss of the tensile strength that occurs when the wellhead equipment is exposed to elevated temperatures.

Although wellhead housings and valve housings become large when the walls thereof are oversized, i.e., when API type materials are employed therefor, such housings nevertheless remain within practical limits. Therefore, there is no necessity to make use of exotic steels, etc. for this type of equipment. This is not to say, though, that future developments in the area of materials research may not produce new cost effective, high strength alloys, which will enable a reduction to be had in the sizing of wellheads and valves of the type that fall within the category of 5000 psig working pressure equipment.

Turning now to the matter of the sealability of the connections and seals that are embodied in wellhead equipment, it is essential for the reasons that have been discussed previously herein that such connections and seals be effectuated through the use of metal-to-metal seals. On the other hand, however, if such metal-to-metal seals are to be capable of exhibiting adequate tensile strength at elevated temperatures the view has been taken that there must be utilized therein high strength materials as overlays or seal ring materials. Elastomers, as they are known today, are known to perform unsatisfactorily when employed under the sort of conditions to which wellhead equipment is subjected when a wellhead fire occurs. The one nonmetallic material which may have some merit for use in such applications is that which is referred to by those in this industry as "Grafoil".

By and large, therefore, it can thus be seen that in order to develop wellhead and valve equipment that is fire resistant, i.e., satisfies insofar as the principal requirements for fire resistance are concerned the statement of requirements that is embodied in API's RP6F "Modified", a need has existed to develop improved sealing techniques that would be suitable for use to effect seals that would maintain their sealability at elevated temperatures. More specifically, there has existed a need to develop improved high temperature sealing techniques that would be applicable for use in connection with both the tubular and annular seals that are to be found in wellhead equipment, and which would enable the latter equipment to withstand in terms of sealability the range of temperatures to which such equipment would commonly be exposed in the course of a wellhead fire. In this context, in order to develop such an improved high temperature sealing technique there would exist a need to address the following areas: the thermal and metallurgical characteristics of the materials involved, the relative movement that occurs between the mating parts, and the sliding action that the seal must endure.

Attempts at the development of such high temperature sealing techniques have been undertaken. Further, the focus thereof at the outset was predicated on the following notions. Foremost was the notion that a clamp connection because of its mass would prove to be beneficial insofar as a fire resistant connection is concerned. Moreover, it was felt that such a clamp connection would probably prove to be the only suitable connection for use in wellhead and valve equipment that was designed to be fire resistant. Accordingly, considerable time and effort was devoted to the development of a suitable clamp connection that would maintain its sealability at elevated temperatures. However, not only did the mass of a large enhanced clamp prove to be detrimental to heat exchange properties of the wellhead and valve equipment per se, but indeed proved to be uncontrollable in terms of torsional deflection and permanent set. In turn, the latter prevented retention of any seal that was dependent upon the clamp connection as a holding device.

As a result of the realization of the above, the development of a studded clamp connection was undertaken. However, the unfavorable heat transfer properties of the added mass of the large clamp soon led to the embodiment of the clamp itself. This was done principally so that a more favorable heat transfer could be realized in a less irregular surface surrounding the wellhead housing. It was then concluded that in the context of attempting to render wellhead and valve equipment fire resistant large clamp connections should not be utilized.

Enhanced flange connections have since been developed which are capable of maintaining the required seal contact force and connection stability. Furthermore, it is practical to prepare such an enhanced flange connection with a hub profile that may be utilized during the drilling operation. Notwithstanding this though it is still strongly recommended that large clamps not be utilized in wellhead and valve equipment that is intended to be designated as being fire resistant.

Thus, to summarize, it has been concluded from analytical and test results that API type materials are suitable for use in forming pressure containing members of wellhead housings, valve bodies, and bonnets. Further, it is viewed as being practical to construct valve bodies and wellhead housings of such materials. That is, the use of such materials for this purpose does not lead to enormous enlargement of the equipment to the point of being impractical. On the other hand, however, it must be recognized that API type materials are not suitable for use in performing a sealing function. Accordingly, it is essential that within any wellhead and valve equipment housings that overlays and seal rings of high strength materials be inserted. Furthermore, these overlays and seal rings of high strength material must be of sufficient size and integrity to withstand the loading forces necessary to effect the sealing function. In addition, the materials utilized in this connection in the overlays and in the seal rings must of necessity be selected for compatibility, for their elevated temperature strength, and of great importance, their thermal conductivity. Namely, it is very important that the material selected for use in these sealing areas be compatible from the standpoint of thermal expansion and contraction, corrositivity, weldability and gall resistance. However, even when the above criteria have been satisfied, there still remains a need to provide a high temperature seal, which in terms of its design as contrasted to the matter of the materials from which it is formed, is suitable for use in wellhead and valve equipment that may be subjected to elevated temperatures of the type that are experienced during the course of a wellhead fire. That is, a need has been evidenced for a seal design wherein a seal constructed in accordance therewith would when employed in wellhead and valve equipment be characterized by the fact that it possessed the capability of maintaining its sealability even when the wellhead and valve equipment in which it was embodied was involved in a wellhead fire.

In particular, a need has been evidenced for a connection, i.e., seal, which would be advantageously characterized by its heat transfer capbilities. More specifically, it is desired to provide a connection, i.e., seal, which is particularly suited for use in the manner of an annular seal such as, for example, between a wellhead housing and a mandrel hanger, and which in addition exhibits an enhanced heat transfer capability from the wellhead housing to the seal ring of the seal and from the latter to the mandrel.

It is, therefore, an object of the present invention to provide a new and improved connection, i.e., a seal, suitable for employment in wellhead and valve equipment.

It is another object of the present invention to provide such a connection, i.e., a seal, which when employed in a wellhead and valve equipment is capable of withstanding the conditions imposed thereupon during the occurrence of a wellhead fire It is still another object of the present invention to provide such a connection, i.e., a seal, which is characterized in that it exhibits adequate tensile strength even at the elevated temperatures that exist when a wellhead fire occurs.

A further object of the present invention is to provide such a connection, i.e., a seal, which is characterized in that it exhibits the capability of being able to maintain its sealability even at the elevated temperatures that exist when a wellhead fire occurs.

A still further object of the present invention is to provide heat transfer means particularly suited for use in a connection, i.e., a seal, of the sort that is intended for employment in wellhead and valve equipment of the type that is designed to be denoted as being fire resistant.

Yet another object of the present invention is to provide heat transfer means comprising an internal heat transfer element and an annular cavity heat transfer element which when employed as a component of a connection, i.e., a seal, in wellhead and valve equipment is operative to enhance the heat transfer characteristics of the connection, i.e., seal.

Yet still another object of the present invention is to provide such a connection, i.e., a seal, embodying such a heat transfer means which is relatively inexpensive to provide and easy to employ, while yet being capable of providing reliable and effective service even when exposed to the conditions that exist when a wellhead fire occurs.

SUMMARY OF THE INVENTION

In accordance with the present invention there is provided a new and improved fire resistant connection, i.e., seal, that embodies a heat transfer means which is operative for purposes of effectuating the establishment of a fire resistant connection and seal between mating surfaces, particularly mating surfaces of the type that are commonly encountered in wellhead and valve equipment. The subject connection, i.e., seal, encompasses mating sealing surfaces such as, for example, the inner surface of a wellhead housing and the external surface, i.e., wall of a hanger mandrel, a U-shaped seal ring, and the aforereferenced heat transfer means. When the subject connection, i.e., seal, is in its assembled, i.e., sealing, condition, the U-shaped seal ring is suitably positioned within the space that exists between the wellhead housing and the wall of the hanger mandrel such that a slight interference fit prevails between the U-shaped seal ring and both the wellhead housing and the hanger mandrel. The heat transfer means is designed to enhance the heat transfer that occurs between the wellhead housing, the seal ring and the hanger mandrel. To this end, the heat transfer means includes an internal heat transfer element preferably formed of graphoil which is suitably configured so as to be insertable between the depending leg portions of the U-shaped seal ring, and an annular heat transfer element preferably formed of aluminum bronze that is suitably configured so as to fit within the cavity defined by the wellhead housing and the hanger mandrel.

DESCRIPTION OF A PREFERRED EMBODIMENT

Figure 1:
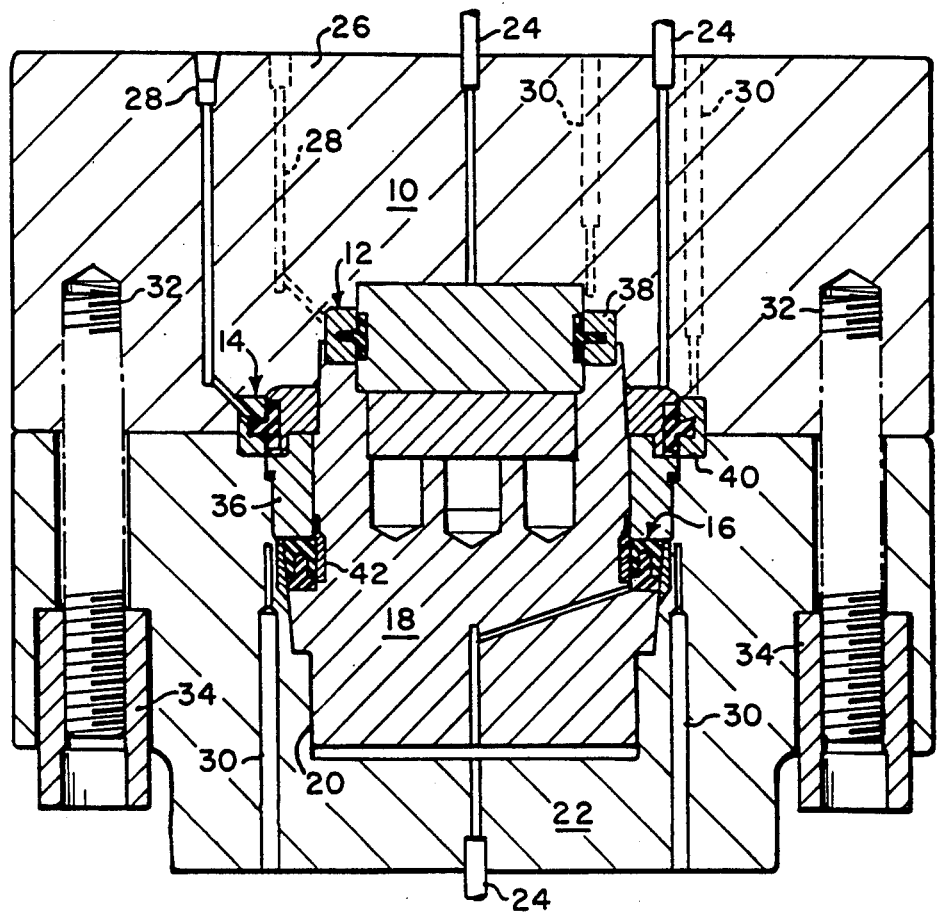
FIG. 1 is a schematic representation of a test fixture depicting emplaced therewithin in its operative, i.e., sealing, state a fire resistant connection, i.e., seal, embodying heat transfer means constructed in accordance with the present invention.

Referring now to the drawing, and more particularly to FIG. 1 thereof, there is to be found depicted therein a test fixture, generally designated by the reference numeral 10. The test fixture 10 is operative for purposes of testing under simulated conditions the various components of a wellhead assembly that would be utilized during the course of a drilling and completion operation for oil and/or gas. Moreover, the test fixture 10 is designed to be operative for purposes of qualifying the connections and seals that are utilized in wellhead and valve equipment as being fire resistant, i.e., as satisfying the statement of requirements that have been promulgated by the American Petroleum Institute in API RP6F "Modified".

The test fixture 10 when constructed as shown in FIG. 1 is capable of being employed to simultaneously effect the testing of three connections, i.e., seals, the latter being denoted generally in FIG. 1 by the reference numerals 12, 14 and 16. To this end, the test fixture 10 can be utilized for purposes of simulating a tubing head component test. The objective in such a test is to utilize the test fixture 10 for purposes of checking out the following components: a studded flange assembly with the connection, i.e., seal, 14 being cooperatively associated therewith; a tubing hanger with the connection, i.e., seal, 12 being cooperatively associated therewith; and a tubing hanger with the connection, i.e., seal, 16 being cooperatively associated therewith.

The tubing hanger assembly used in the test fixture 10, must, of necessity, be capable of simulating the conditions that would occur when tubing weight and holddown screws combine to lock a tubing hanger into position. Accordingly, for purposes of the test fixture 10, a tubing hanger is depicted at 18 in FIG. 1. The tubing hanger 18 is provided with a threaded connection at the bottom thereof seen at 20 in FIG. 1. This threaded connection 20 is designed to function as a substitute for the condition described above wherein the tubing weight and holddown screws combine to lock a tubing hanger into position. In addition, the threaded connection 20 serves to stabilize the tubing hanger section 18 within the tubing head housing identified in FIG. 1 by the reference numeral 22.

With further reference to FIG. 1, as depicted therein the center of the mandrel tubing hanger 18 is also the means of porting for one, or more, of the several monitoring/pressure or thermal observation ports necessary in the test assembly, i.e., fixture 10. By way of exemplification in this regard, pressure ports are denoted by the reference numeral 24 in FIG. 1. The upper flange 26 of the test assembly 10 is intended to simulate the bottom of a block valve assembly, which would normally be prepared as the tubing bonnet. As such, from the anular seal cavity on, the test fixture 10 is a true representation of an actual tubing wellhead assembly.

In accordance with the test criteria of API RP6F "Modified", pressure is held on all of the seals 12, 14 and 16 that are emplaced within test fixture 10 when the test cycle is being conducted thereon. For purposes of applying pressure to the seals 12, 14 and 16 and ensuring that the latter pressure is held throughout the test cycle, the afore-referenced pressure ports 24 are suitably located within the test fixture 10. Leakage, should it occur is monitored through ports, such as those identified by the reference numeral 28 in FIG. 1. To this end, as seen with reference to FIG. 1 the monitoring ports are suitably placed in the test fixture 10 so as to be located adjacent to each of the seal areas 12, 14 and 16. Thermally, the behavior of the seals 12, 14 and 16 in the test fixture 10 is monitored by placing thermocouples, such as those identified by the reference numeral 30 in FIG. 1, adjacent to each of the seals 12, 14 and 16. Preferably, all pressure and thermal measurements are recorded on strip chart recorders during the entire duration of the test cycle. Further, the volumetric leakage from any monitored area is preferably also collected and recorded.

With further reference to FIG. 1, studs 32 and nuts 34 retain the housing bonnet, i.e., flange, 26 of the test fixture 10 in contact with the connection, i.e., seal, 14. In addition, the same studs 32 and nuts 34 provide the restraining force for the connection, i.e., seal, 12 at the top of the seal area of the tubing hanger 18. Accordingly, any thermally active growth occurring in the wall of the housing 26 adjacent to either of the seals 12 and 14 must be accommodated by one or both of these two seals 12 and 14. Similarly, the seal 16 interacts to the movement of the tubing hanger mandrel 18. It should also be noted here that the seal 16 also interacts with the tubing hanger seal 12 located thereabove. Thus, it can be seen that the interaction resulting from thermal activity can and does occur between all three of the seal areas 12, 14 and 16. This interaction is a principal design concern in the development of wellhead and valve equipment that is intended to be fire resistant, i.e., be capable of satisfying the requirements set forth in API RP6F "Modified". Furthermore, this interaction becomes of even greater concern when a primary flanged seal is to be inserted into the system as has been done, for example, in the case of the test fixture 10.

Completing the description of the test fixture 10 as shown in FIG. 1, a retaining ring 36 is interposed between the tubing hanger 18 and the modified flange 22. Also, hardfaced seal surfaces overlays are cooperatively associated respectively with each of the seals 12, 14 and 16. In accord with the best mode embodiment of the test fixture 10, the material from which the tubing hanger 18, the flange 26 and nuts 34 are each formed is as an example preferably AISI-4140. Further, the hardseal surfaces overlays 38, 40 and 42 are as an example preferably each formed from Inconel 625, the latter being a trademark of International Nickel. Lastly, the material from which the studs 32 are formed is preferably Inconel X-750, the latter being a trademark of International Nickel.

A description will now be had in more detail of the connection, i.e., seal, embodying heat transfer means, which is denoted by the reference numeral 16 in FIG. 1, and which forms the subject matter of the present invention. For this purpose, reference will be had to both FIGS. 1 and 2 of the drawing. As best understood with reference to FIGS. 1 and 2, the connection, i.e., seal, 16 encompasses a pair of mating sealing surfaces, the latter constituting the tubing hanger 18 and the tubing head housing, i.e., modified flange, 22 in the case of the structure which is illustrated in FIG. 1; a U-shaped sealing means, the latter being identified by the reference numeral 44 in FIG. 2; and heat transfer means, generally designated by the reference numeral 46 in FIG. 2.

Figure 2:
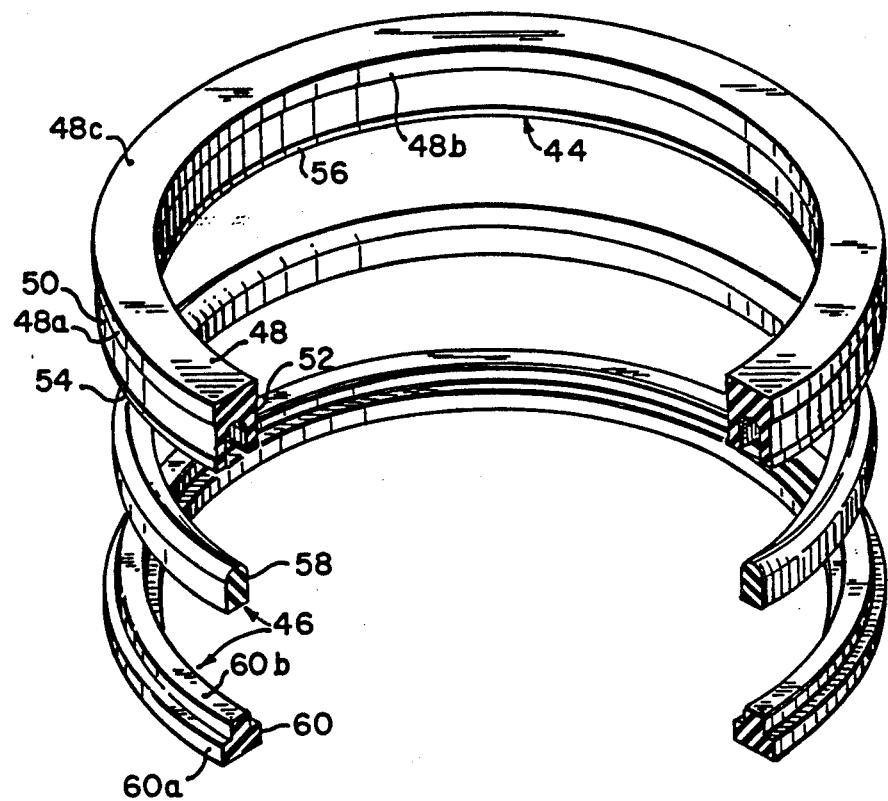
FIG. 2 is an exploded perspective view on an enlarged scale and with portions cutaway of the seal ring and heat transfer means of a fire resistant connection, i.e., seal, constructed in accordance with the present invention.

The U-like sealing means 44, as best understood with reference to FIG. 2 of the drawing, takes the form of a U-shaped seal ring. To this end, the U-shaped seal ring 44 as shown in FIG. 2 is substantially cylindrical in nature. Further, the U-shaped seal ring 44 includes a heavy structural rib 48 and a pair of legs 50 and 52 that depend therefrom and which each terminate in a seal lip 54 and 56, respectively. The latter seal lips 54 and 56 are suitably formed on the external surfaces of the depending legs 50 and 52, respectively. Further, note is made of the fact that as depicted in FIG. 2 of the drawing, the rib 48 is slightly enlarged, i.e., includes the portions identified by the reference numerals 48a and 48b in FIG. 2, on each side of the planar portion 48c thereof for a purpose yet to be described. In accord with the best mode embodiment of the invention, the enlarged portions 48a and 48b of the rib 48 are each suitably dimensioned so as to be substantially identical one to another in terms of size. Likewise, each of the seal lips 54 and 56 is suitably dimensioned so as to be substantially identical one to another in terms of size.

Continuing with the description of the U-shaped seal ring 44, it can be seen from FIG. 2 of the drawing that the planar portion 48c of the rib 48 is operative to define a first plane. Furthermore, it can be seen from FIG. 2 that the seal lips 54 and 56 each embody a planar surface. Also, as shown in FIG. 2 the seal lips 54 and 56 lie in planes that are parallel one to another as well as being perpendicular to the plane that the planar portion 48c of the rib 48 defines.

The heat transfer means 46 will now be described with particular reference being given for this purpose to FIG. 2 of the drawing. As illustrated in the latter Figure, the heat transfer means 46 includes an internal heat transfer element 58 and an annular cavity heat transfer element 60. In accord with the best mode embodiment of the present invention, the heat transfer element 58 is as an example preferably formed of the material known to those in this industry as Grafoil, while the heat transfer element 60 is as an example preferably formed of an aluminum bronze material. Further, the molded Grafoil element 58, as best seen with reference to FIG. 2 of the drawing, is suitably shaped and dimensioned so as to be capable of being inserted into the cavity defined by the depending legs 50 and 52 of the U-shaped seal ring 44. That is, the configuration of the molded graphoil heat transfer element 58 is chosed to be such that it is complementary to the configuration of the cavity that exists between the legs 50 and 52 of the U-shaped seal ring 44. Moreover, the density of the Grafoil or metallic fibers which comprise the heat transfer element 58 is preferably selected to be such that a spring effect is obtained therewith when the heat transfer element 58 is inserted in the cavity defined by the legs 50 and 52 of the U-shaped seal ring 44. By virtue of the existence of this spring effect the Grafoil element, i.e., member, 58 is capable of breathing under changing temperature conditions without losing contact with the seal ring 44. The aluminum bronze heat transfer element 60 is utilized as a backup to the molded Grafoil heat transfer element 58. To this end the aluminum bronze heat transfer element 60 retains the compressible member, i.e., molded Grafoil heat transfer element, 58 in position when the latter is emplaced within the cavity formed by the depending legs 50 and 52 of the U-shaped seal ring 44. In conclusion, it will be seen with reference to FIG. 2 that the aluminum bronze heat transfer element 60 embodies, in accord with the best mode embodiment thereof, a configuration that resembles substantially that of an inverted T. The latter inverted T is defined by the base 60*a* of the aluminum bronze heat transfer element 60 from which an upstanding rib portion 60*b* projects.

With further reference in particular to FIG. 1 of the drawing, the connection, i.e., seal, 16 is designed to be employed with the heat transfer means 46 cooperatively associated therewith. To this end, with the molded Grafoil heat transfer element 58 positioned in the cavity defined by the depending legs 50 and 52 of the U-shaped seal ring 44 and with the aluminum bronze heat transfer element 58 functioning to retain the heat transfer element 58 in position relative to the U-shaped seal ring 44, the seal 16 can be made to occupy the position thereof that is found depicted in FIG. 1 of the drawing. In accordance with the showing of FIG. 1, when the connection, i.e., seal, 16 embodying the heat transfer means 46 occupies the sealing position thereof depicted therein, the seal lips 54 and 56 contact mating sealing surfaces, denoted by the reference numerals 22 and 18, respectively, in FIG. 1. Like the seal lips 54 and 56 themselves the mating sealing surfaces 22 and 18 embody portions that are substantially planar in nature as well as being substantially cylindrical. That is, the mating sealing surfaces 22 and 18 which the planar seal lips 54 and 56, respectively, are designed to contact each include portions that embody a configuration which is complementary in nature to the configuration of the planar seal lips 54 and 56. Further, with the connection, i.e., seal, 16 embodying the heat transfer means 46 occupying the sealing position thereof as shown in FIG. 1, mechanical loading of the seal 16 is provided by the existence of an interference fit between the enlarged portions 48*a* and 48*b* of the rib 48 and the mating sealing surfaces 22 and 18 which the portions 48*a* and 48*b*, respectively, are designed to contact. As such the seal lips 54 and 56 perform a sealing function.

Continuing, the large mass of the rib, 48, i.e., the height times the width thereof, as compared to that of seal lips 54 and 56 enables two essential functions to be performed by the rib 48. Namely, the rib 48 functions to stabilize the seal lips 54 and 56 such that the latter may function separately, i.e, independent of each other, as the need therefor may arise when the mating sealing surfaces that are in contact therewith are subjected to thermal distortion. Secondly, the large mass of the rib 48 enables the latter to function to provide effective heat transfer to the seal area.

With respect to the matter of heat transfer, the rib 48 may be plated with a suitable material having a high heat transfer coefficient in order to enhance the direct transfer of heat from the rib section into the heavy rib area. Additional heat transfer occurs through the aluminum bronze heat transfer element 60 which is in contact below the seal ring 44 with the mating sealing surfaces 22 and 18. That is, the aluminum bronze heat transfer element 60 performs the function of conducting heat into, and out of, the sealing area through the molded Grafoil heat transfer element 58. The Grafoil heat transfer element 58 in turn is in direct contact with the internal configuration of the cavity formed between the depending legs 50 and 52 of the U-shaped seal ring 44.

The mating sealing surfaces 22 and 18 are preferably prepared with hard surfacing to prevent galling. Likewise, anti-galling compounds are utilized preferably on the seal ring 44 to allow freedom of movement of the seal lips 54 and 56 during a thermally active cycle without the galling thereof. In this regard, any malleable coating material which possesses good heat transfer properties as well as high gall resistance at 1200° F. is suitable for use for this purpose, such as silver.

In summary, it has been found that a connection, i.e., seal, constructed in the manner of the seal 16 will maintain its sealability at elevated temperatures of the type encountered during the occurrence of a wellhead fire notwithstanding the fact that the members which the seal 16 serves to connect may undergo axial movement. This is in contrast to prior art forms of metal-to-metal seals wherein due to the angular inclination of the surfaces thereof, relative axial movement tends to cause the mating sealing surfaces to separate and thereby renders the sealing action of the metal-to-metal seal ineffective.

Radial movement of the members which the connection, i.e., seal, 16 serves to connect is not a problem because of the fact that the coefficients of expansion of the material from which these members are formed are chosen to as to be very similar. Accordingly, the amount of radial movement that occurs is so slight as to be insufficient to overcome the spring forces being exerted by the seal lips 54 and 56 of the seal 16 against the mating sealing surfaces 22 and 18.

Thus, in accordance with the present invention there has been provided a new and improved form of connection, i.e., seal that is suitable for employment in wellhead and valve equipment. Moreover, the subject connection, i.e., seal, of the present invention when employed in wellhead and valve equipment is capable of withstanding the conditions imposed thereupon during the occurrence of a wellhead fire. In addition, in accord with the present invention a connection, i.e., seal, is provided which is characterized in that it exhibits adequate tensile strength even at the elevated temperatures that exist when a wellhead fire occurs. Further, the connection, i.e., seal, of the present invention is characterized in that it exhibits the capability of being able to maintain its sealability even at the elevated temperatures that exist when a wellhead fire occurs. Additionally, in accordance with the present invention a heat transfer means is provided which is particularly suited for use in a connection, i.e., seal, of the sort that is intended for employment in wellhead and valve equipment of the type that is designed to be denoted as being fire resistant. Also, the heat transfer means of the present invention comprises an internal heat transfer element and an annular cavity heat transfer element which when employed as a component of a connection, i.e., a seal, in wellhead and valve equipment is operative to enhance the heat transfer characteristics of the connection, i.e., seal. Furthermore, in accord with the present invention a connection, i.e., seal, embodying such a heat transfer means is provided which is relatively inexpensive to provide and easy to employ, while yet being capable of providing reliable and effective service even when exposed to the conditions that exist when a wellhead fire occurs.

While only one embodiment of our invention has been shown, it will be appreciated that modifications thereof, some of which have been alluded to hereinabove, may still be readily made thereto by those skilled in the art. We, therefore, intend by the appended claims to cover the modifications alluded to herein as well as all other modifications, which fall within the true spirit and scope of our invention.

What is claimed is:

1. In a connection for effectuating the establishment of a fire resistant connection and seal between mating sealing surfaces, the connection including a continuous seal ring having a rib formed thereon and a pair of legs depending from the rib such that the pair of legs define a cavity therebetween, a first and a second mating sealing surface, the improvement comprising heat transfer means cooperatively associated with the connection, said heat transfer means including a first heat transfer element and a second heat transfer element, said first heat transfer element having a configuration complementary to the configuration of the cavity formed in the continuous seal ring, said first heat transfer element being supported in the cavity formed in the continuous seal ring, said second heat transfer element including a base and a rib upstanding from said base, said second heat transfer element having a substantially inverted T-shaped configuration, said second heat transfer element being supported in juxtaposed relation to the continuous seal ring with said upstanding rib of said second heat transfer element in engagement with said first heat transfer element and with said base of said second heat transfer element in engagement with the free ends of the pair of legs of the continuous seal ring such that said first heat transfer element is operative to enhance the heat transfer between the continuous seal ring and the first and second mating sealing surfaces and said second heat transfer element is operative to enhance the heat transfer between said first heat transfer element and the first and second mating sealing surfaces.

2. In a connection the improvement of heat transfer means as set forth in claim 1 wherein said first heat transfer element is formed of molded Grafoil.

3. In a connection the improvement of heat transfer means as set forth in claim 2 wherein said second heat transfer element is formed of aluminum bronze material.

4. Heat transfer means for use in cooperative association with a seal ring, having a rib formed thereon and a pair of legs depending from the rib such that the pair of legs define a cavity therebetween, of a fire resistant connection comprising: a first heat transfer element and a secone heat transfer element, said first heat transfer element having a configuration complementary to the configuration of the cavity formed in the continuous seal ring, said first heat transfer element being supported in the cavity of the continuous seal ring, said second heat transfer element including a base and a rib upstanding from said base, said second heat transfer element having a substantially inverted T-shaped configuration, said second heat transfer element being supported in juxtaposed relation to the continuous seal ring with said upstanding rib of said second heat transfer element in engagement with said first heat transfer element and with said base of said second heat transfer element in engagement with the free ends of the pair of legs of the continuous seal ring such that said first and second heat transfer elements are each operative to enhance the heat transfer characteristics of the fire resistant connection.

5. Heat transfer means as set forth in claim 4 wherein said first heat transfer element is formed of molded Grafoil.

6. Heat transfer means as set forth in claim 5 wherein said second heat transfer element is formed of aluminum bronze material.

7. In wellhead equipment including first and second members, a fire resistant connection for connection together the first and second members, the connection including a continuous seal ring having a rib formed thereon and a pair of legs depending from the rib such that the pair of legs define a cavity therebetween, a first mating sealing surface formed in the first member, a second mating sealing surface formed in the second member, the improvement comprising heat transfer means cooperatively associated with the connection, said heat transfer means including a first heat transfer element and a second heat transfer element, said first heat transfer element having a configuration complementary to the configuration of the cavity formed in the continuous seal ring, said first heat transfer element being supported in the cavity formed in the continuous seal ring, said second heat transfer element including a base and a rib upstanding from said base, said second heat transfer element having a substantially inverted T-shaped configuration, said second heat transfer element being supported in juxtaposed relation to the continuous seal ring with said upstanding rib of said second heat transfer element in engagement with said first heat transfer element and said base of said second heat transfer element in engagement with the free ends of the pair of legs of the continuous seal ring such that said first heat transfer is operative to enhance the heat transfer between the continuous seal ring and the first and second mating sealing surfaces and said second heat transfer element is operative to enhance the heat transfer between said first heat transfer element and the first and second mating sealing surfaces.

8. In wellhead equipment the improvement of heat transfer means as set forth in claim 7 wherein said first heat transfer element is formed of molded Grafoil.

9. In wellhead equipment the improvement of heat transfer means as set forth in claim 8 wherein said second heat transfer element is formed of aluminum bronze material.

* * * * *